(12) United States Patent
Miyako et al.

(10) Patent No.: US 6,773,178 B2
(45) Date of Patent: Aug. 10, 2004

(54) KEYBOARD SLIDE MECHANISM

(75) Inventors: Shunichi Miyako, Kyoto (JP);
Yukihiro Tsubosaka, Yamatokouriyama (JP); Hirosi Tasiro, Gojo (JP);
Masayuki Katagiri, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 10/090,732

(22) Filed: Mar. 6, 2002

(65) Prior Publication Data
US 2002/0126446 A1 Sep. 12, 2002

(30) Foreign Application Priority Data

Mar. 7, 2001 (JP) .......................................... 2001-063008
May 10, 2001 (JP) .......................................... 2001-139655

(51) Int. Cl.⁷ ................................................. B41J 5/16
(52) U.S. Cl. ........................................ 400/472; 400/691
(58) Field of Search ............................... 400/472, 488, 400/482, 495, 693, 691; 361/680, 681; 200/5 R, 52 R; 235/145 R, 145 A, 146; 345/168, 169

(56) References Cited

U.S. PATENT DOCUMENTS 5,635,928 A * 6/1997 Takagi et al. .................. 341/22
5,754,395 A * 5/1998 Hsu et al. .................... 361/680
5,768,094 A * 6/1998 Merkel ........................ 361/680
6,087,966 A * 7/2000 Sato ............................. 341/22
6,094,191 A * 7/2000 Watanabe et al. ........... 345/168
6,529,370 B1 * 3/2003 Kamishima ................. 361/680
6,590,565 B2 * 7/2003 Hosoya ....................... 345/168

FOREIGN PATENT DOCUMENTS

| JP | 5-298000 | 11/1993 |
| JP | 9-259684 | 10/1997 |
| JP | 2857353 | 11/1998 |

* cited by examiner

Primary Examiner—Anthony H. Nguyen
(74) Attorney, Agent, or Firm—Birch, Stewart, Kolasch & Birch, LLP

(57) ABSTRACT

A keyboard slide mechanism for use in a keyboard that is so structured that key tops are raised and lowered as a sliding member is slid has a rotary member that can be rotated, converting means for converting the rotating movement of the rotary member into translating movement, and movement magnifying means for magnifying the translating movement produced by the converting means. The key tops are raised and lowered by converting the rotating movement of the rotary member into translating movement with the converting means, then magnifying the translating movement with the movement magnifying means, and then transmitting the magnified translating movement to the sliding member.

31 Claims, 6 Drawing Sheets

KEYBOARD SLIDE MECHANISM

BACKGROUND OF THE INVENTION

1. Field of the Invention

The present invention relates to a keyboard slide mechanism for use in a notebook personal computer, personal digital assistant, word processor, typewriter, or the like, and to an information device provided with such a keyboard slide mechanism.

2. Description of the Prior Art

In recent years, in products like information devices, such as portable personal computers as represented by notebook personal computers, in which portability is an important factor to be considered to form the product concept, further reduction of weight and thickness has been sought. On the other hand, there is a demand for better operability of such information devices as achieved in particular by maximizing the keystroke of the keyboard used as a main input means in them to make the feel of their keyboard as close as possible to that of the ordinary keyboard used in desktop personal computers.

To meet these conflicting demands, for example, Japanese Patent Application Laid-Open No. H8-54964 (Japanese Patent Registered No. 2857353) discloses a keyboard structure in which individual keys are expanded and contracted as a lid is opened and closed.

Moreover, for example, Japanese Patent Application Laid-Open No. H5-298000 (Japanese Patent Registered No. 2875697) discloses a keyboard for use as an input means in an information processing device in which, when the keyboard is not used, the key tops are held down to make the device thin and easily portable and, when the keyboard is used, the key tops are brought up to secure a sufficient key stroke for better operability of the device.

Moreover, for example, Japanese Patent Application Laid-Open No. H9-259684 discloses a keyboard that is raised and lowered as a lid is opened and closed for better operability of the device incorporating it, eventually making the device thin and easily portable.

However, in the structure disclosed in Japanese Patent Application Laid-Open No. H8-54964 (Japanese Patent Registered No. 2857353) mentioned above, to drive a base structure (signal pad structure) from a first position to a second position, it is necessary to use a cam that has a protruding portion formed thereon so as to protrude from a lid housing having a display screen housed therein. This not only makes satisfactory reduction of thickness impossible, but is also undesirable in terms of safety and appearance.

In the structure disclosed in Japanese Patent Application Laid-Open No. H5-298000 (Japanese Patent Registered No. 2875697) mentioned above, large mechanisms are necessary to permit sliding movement of a flat spring sheet, to permit sliding operation of a slide bar, and to permit a sheet member to move upward and downward as the lid is opened and closed. This makes satisfactory reduction of weight and thickness impossible.

In the structure described in Japanese Patent Application Laid-Open No. H9-259684 mentioned above, a large mechanism is necessary to move a housing unit. This makes satisfactory reduction of weight and thickness impossible.

SUMMARY OF THE INVENTION

An object of the present invention is to provide a keyboard slide mechanism for use in a keyboard structure that permits further reduction of weight and thickness without sacrificing operability and reliability in a portable personal computer or the like.

To achieve the above object, according to the present invention, a keyboard slide mechanism for use in a keyboard that is so structured that key tops are raised and lowered as a sliding member is slid is provided with a rotary member that can be rotated, converting means for converting the rotating movement of the rotary member into translating movement, and movement magnifying means for magnifying the translating movement produced by the converting means. Here, the key tops are raised and lowered by converting the rotating movement of the rotary member into translating movement with the converting means, then magnifying the translating movement with the movement magnifying means, and then, transmitting the magnified translating movement to the sliding member.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
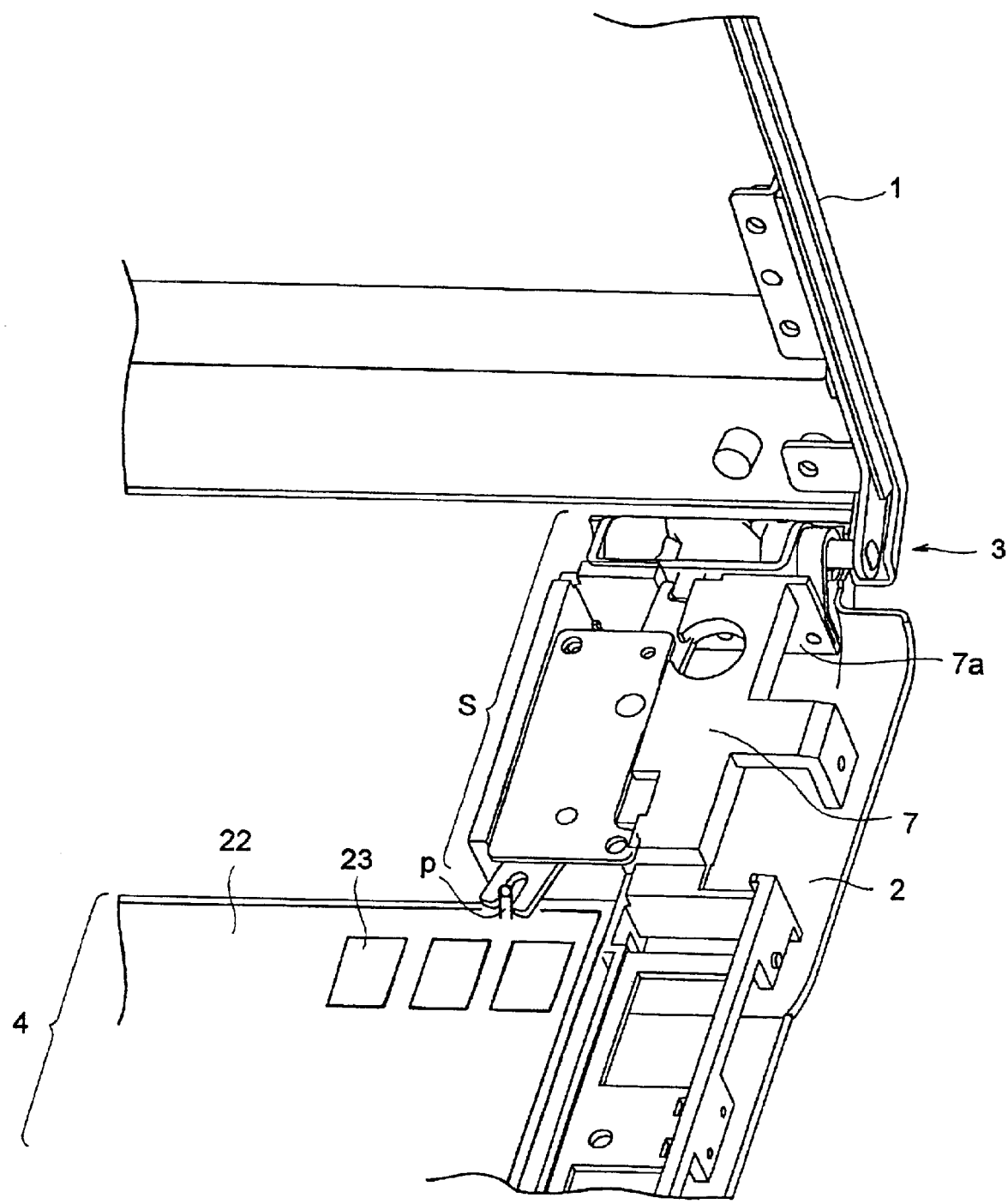
FIG. 1 is a perspective view of a hinge portion and the surrounding portion of a notebook personal computer embodying the invention.

Hereinafter, an embodiment of the present invention will be described with reference to the drawings. FIG. 1 is a perspective view showing a hinge portion and the surrounding portion of a notebook personal computer as an example to which a keyboard slide mechanism embodying the invention is applied. A notebook personal computer like this is composed roughly of a display portion 1 and a body 2. In the following descriptions, the open-end side of the body 2 at which the display portion 1 is opened and closed is called the front side of the body 2, and the hinged-end (central) side of the body 2 at which the display portion 1 is hinged is called the rear side of the body 2. In FIG. 1, the display portion 1 is shown as opened to a predetermined angle.

The display portion 1 has, for example, a liquid crystal panel (not shown) fitted behind the inner surface thereof, and is coupled, at both the left-hand and right hand ends of the bottom side thereof, to the body 2 with hinge portions 3, which will be described later. In FIG. 1, the hinge portion at the left-hand end of the bottom side of the display portion 1 is omitted. The display portion 1 is rotated about these hinge portions 3 and is thereby opened and closed. On the other hand, the body 2 has a keyboard 4 and other unillustrated components, such as a circuit board, housed therein.

At the right-hand end of the rear side of the body 2 is provided a keyboard slide mechanism S embodying the invention. As the display portion 1 is opened and closed, its movement is transmitted through the hinge portion 3, which is a part of the keyboard slide mechanism, to the keyboard slide mechanism S. The keyboard slide mechanism S then operates in such a way as to laterally slide a middle sheet 22, provided inside the keyboard 4, through a pin "p," formed so as to protrude upward from the middle sheet 22, and thereby raise the individual key tops. This mechanism will be described in more detail later. Reference numeral 7 represents a base, a block-like member formed out of a thick plate, that is fixed to the body 2. The base 7 has the rear-end portion thereof formed into a plate-shape portion 7a, to which the hinge portion 3 is fitted. The keyboard slide mechanism S may be provided at the left-hand end of the rear side of the body 2, or at both ends.

Figure 2A:
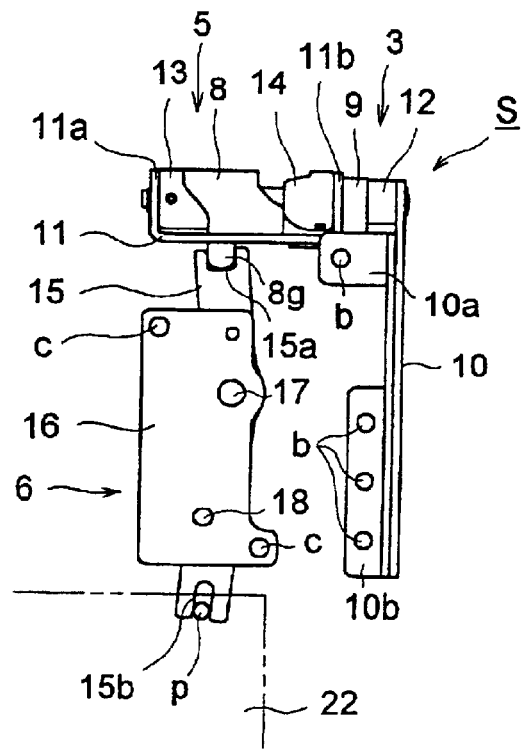
FIGS. 2A to 2C are diagrams showing a keyboard slide mechanism embodying the invention.
Figure 2B:
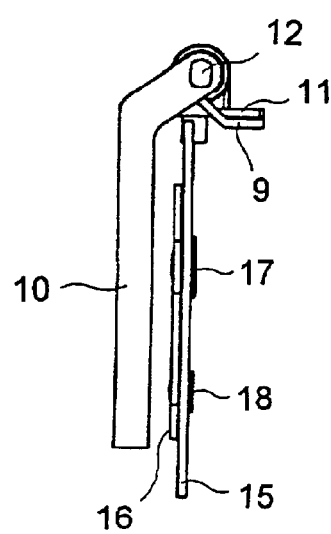
Figure 2C:
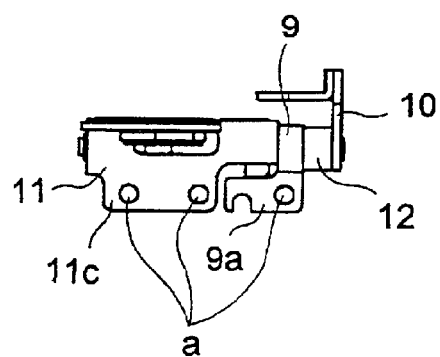
Figure 3:
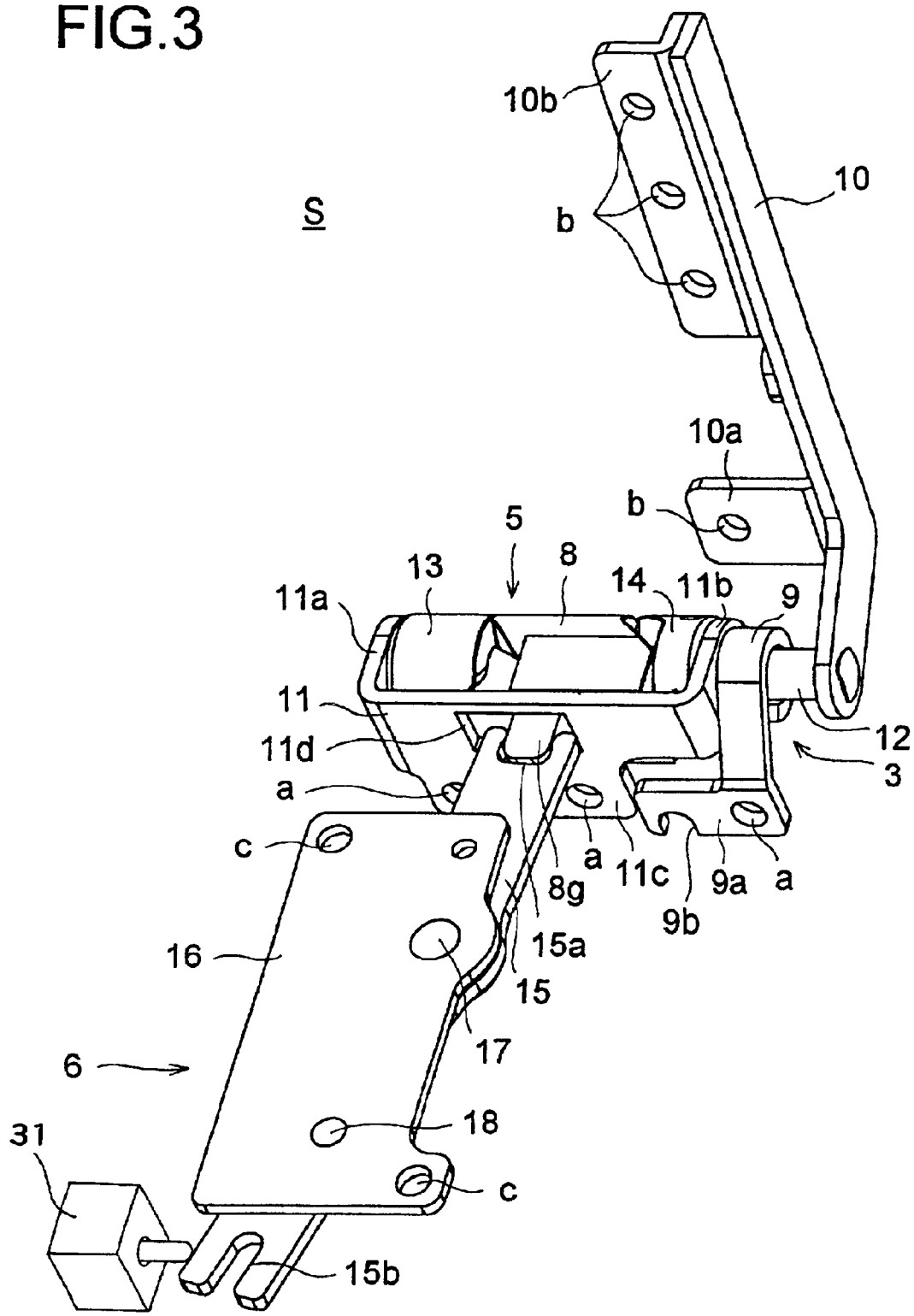
FIG. 3 is a perspective view of the keyboard slide mechanism embodying the invention.

FIGS. 2A to 2C are diagrams showing a keyboard slide mechanism embodying the invention, with FIGS. 2A, 2B, and 2C respectively showing a plan view, a right-hand side view, and a front view thereof. These figures show the keyboard slide mechanism with the display portion 1 closed. FIG. 3 is a perspective view of the keyboard slide mechanism, with the display portion 1 opened to a predetermined angle.

As shown in these figures, the keyboard slide mechanism S embodying the invention is composed essentially of a hinge portion 3, an interlocked cam portion 5, and a slide stroke magnifying lever portion 6. The hinge portion 3 includes a display mount portion 10 having the shape of a substantially L-shaped lever and fixed to the display portion 1, a bracket 9 having the shape of a wound-up elongate plate and fixed to the base 7 of the body 2, and an interlocked cam support portion 11 shaped like the letter C. A shaft 12 is rotatably supported on the interlocked cam support portion 11 and the bracket 9. The shaft 12 is, at the right-hand end thereof, coupled to the hinged end of the display mount portion 10. The interlocked cam support portion 11 has both the left-hand and right-hand ends thereof bent backward so as to form bracket portions 11a and 11b on which the shaft 12 is supported.

The display mount portion 10 has plate-shaped portions 10a and 10b formed so as to extend leftward therefrom. In these plate-shaped portions 10a and 10b are formed holes "b" to permit the display mount portion 10 to be fitted to the display portion 1 with screws. The bracket 9 has a plate-shaped portion 9a formed so as to extend downward therefrom and the interlocked cam support portion 11 has a plate-shaped portion 11c formed so as to extend downward therefrom. In these plate-shaped portions 9a and 11c are formed holes "a" to permit the bracket 9 and the interlocked cam support portion 11 to be fitted to the base 7 with screws. The plate-shaped portion 9a has a U-shaped cut 9b formed in a lower portion thereof for positioning on the base 7.

The display mount portion 10 is fixed to the display portion 1 with screws put through the holes "b" formed in the plate-shaped portions 10a and 10b. The bracket 9 is fixed to the base 7 with screws put through the hole "a" and the cut 9b formed in the plate-shaped portion 9a. As a result, the hinge portion 3 is coupled to the display portion 1 and to the base 7 so as to function as a hinge. The interlocked cam support portion 11 is fixed to the base 7 with screws put through the holes "a" formed in the plate-shaped portion 11c.

The interlocked cam portion 5 is composed of a substantially cylindrical cam 8 penetrated by the shaft 12 so as to be located at the center, a substantially cylindrical cam 13 engaged with the shaft 12 so as to be fixed at the left, and a substantially cylindrical cam 14 engaged with the shaft 12 so as to be fixed at the right. The cams 13 and 14 are individually fixed to the shaft 12 with pins that penetrate the shaft 12 as well as the cams 13 and 14. Thus, as the shaft 12 rotates, the cams 13 and 14 rotate together, but the cam 8, which is freely movable in both the rotating and sliding directions, does not directly rotate together.

The slide stroke magnifying lever portion 6 is composed essentially of a lever 15 having the shape of an elongate plate and a lever support portion 16 having the shape of a flat plate. The lever support portion 16 has holes "c" formed in diagonal corners thereof, and is fixed to the base 7 with screws put through these holes "c." The lever 15 is pivotably supported on a pin 17 that is formed at the right-hand end of a rear portion of the lever support portion 16 so as to protrude downward therefrom. Moreover, a pin 18 provided at the center of a front portion of the lever support portion 16 so as to protrude downward therefrom is put through an elongate hole (not shown) formed in the lever 15. This restricts the range of rotation of the lever 15. By making the lever 15 not thicker than the cams 8, 13, and 14, it is possible to realize a lower-profile structure.

The cam 8 has a projection 8g, having substantially the shape of a rectangular parallelepiped, formed so as to protrude forward therefrom. This projection 8g is put through a rectangular slide hole 11d formed in the interlocked cam support portion 11, and is engaged with a substantially U-shaped cut 15a formed at the rear end of the lever 15. Depending on the rotation angle of the shaft 12, the cam 8 meshes with either the cam 13 or the cam 14. Since the cam 8 is freely rotatable with respect to the shaft 12, as the shaft 12 rotates, the cam 8 tends to rotate together with either the cam 13 or the cam 14 so as to be kept meshed therewith. This rotation of the cam 8 is restricted by the projection 8g formed on the cam 8 and the slide hole 11d formed in the interlocked cam support portion 11. On the other hand, a U-shaped cut 15b formed at the front end of the lever 15 is engaged with the pin "p" formed so as to protrude upward from the right-hand end of a rear portion of the middle sheet 22 provided inside the keyboard 4.

Figure 4A:
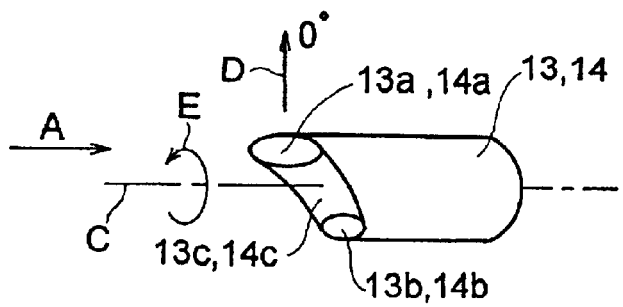
FIGS. 4A to 4D are diagrams showing different portions of the keyboard slide mechanism embodying the invention.

In the structure described above, as the display portion 1 is opened and closed, the display mount portion 10 rotates, and thus the shaft 12 rotates together. Now, the operation of the keyboard slide mechanism embodying the invention will be described with reference to FIGS. 4A to 4D. These figures schematically show different parts of the keyboard slide mechanism embodying the invention. FIG. 4A is a perspective view of the cams 13 and 14 provided in the interlocked cam portion 5 so as to rotate together with the shaft 12.

The cams 13 and 14 each have a protruding portion 13a or 14a having a surface perpendicular to the rotation axis C, a recessed portion 13b or 14b having a surface perpendicular to the rotation axis C, and a slanting surface 13c or 14c. For simplicity's sake, in the following descriptions, when the cam 13 or 14 is in the state shown in FIG. 4A, i.e. in the state in which the protruding portion 13a or 14a is located in the highest position, it is described as positioned at a rotation angle of 0° as indicated by arrow D. It is assumed that the rotation angle increases counter-clockwise about the rotation axis C as indicated by arrow E when the cam 13 or 14 is viewed from the direction in which it has its protruding and recessed portions.

Figure 4B:
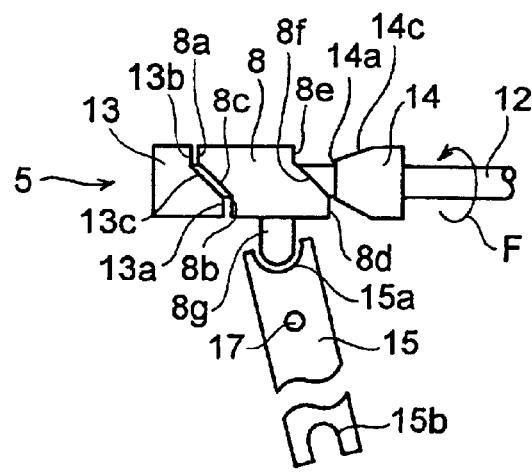
Figure 4C:
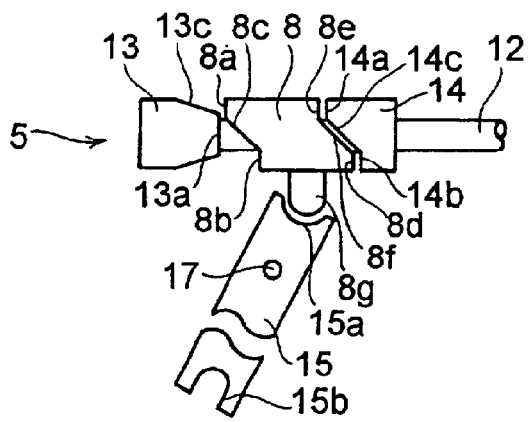
Figure 4D:
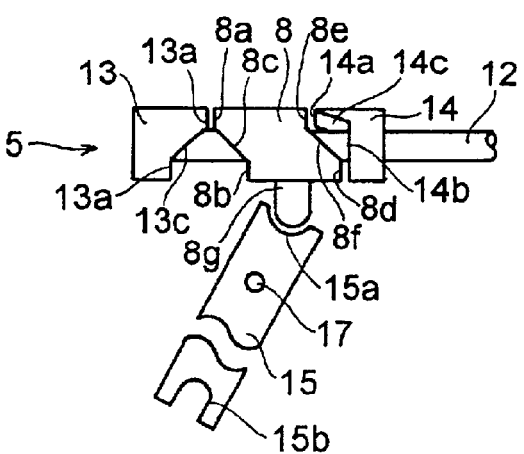

FIG. 4B shows the state of the interlocked cam portion 5 and the lever 15 when the display portion is closed. FIG. 4C shows the state of the interlocked cam portion 5 and the lever 15 when the display portion is opened and the key tops, described later, of the keyboard are raised so as to make the keyboard ready to be operated. FIG. 4D shows the state of the interlocked cam portion 5 and the lever 15 when the display portion is further opened.

As described earlier, the interlocked cam portion 5 is composed of a substantially cylindrical cam 8 penetrated by the shaft 12 so as to be located at the center, a substantially cylindrical cam 13 engaged with the shaft 12 so as to be fixed at the left, and a substantially cylindrical cam 14 engaged with the shaft 12 so as to be fixed at the right. Here, as the shaft 12 rotates, the cams 13 and 14 rotate together, but the cam 8, which is freely movable in both the rotating and sliding directions, does not directly rotate together. The cam 8 has nothing to do with the rotation of the shaft 12, and thus does not rotate but reciprocates laterally along the shaft 12 by being meshed with either the cam 13 or the cam 14.

Suppose that the display portion 1 is now closed. As shown in FIG. 4B, the cam 13 at the left is positioned, according to the definition explained earlier, at a rotation angle of 180°. The cam 8 is in contact with, and is thus meshed with, the cam 13. Specifically, the surfaces of the cams 8 and 13 that face each other are all in contact with each other, i.e. the protruding portion 8a with the recessed portion 13b, the slanting surface 8c with the slanting surface 13c, and the recessed portion 8b with the protruding portion 13a. In this state, the cam 14 located at the opposite side of the cam 8 is positioned at a rotation angle of about 300°. Here, the cam 8 is in contact with the cam 14 at the protruding portions 8d and 14a. On the other hand, the cam 8 is meshed with the cam 13, and is thus located at the left-hand end of the stroke of the reciprocating movement of the cam 8. Naturally, the projection 8g formed integrally on the cam 8 is located at the left.

When the display portion 1 starts opening, and the shaft 12 starts rotating in the direction indicated by arrow F shown in FIG. 4B, the slanting surfaces 8c and 13c of the cams 8 and 13, which have up to this point been in contact with each other, start twisting relative to each other and thus start going out of mesh with each other. By contrast, the slanting surfaces 8c and 14c of the cams 8 an 14 start coming into mesh with each other. Meanwhile, the cam 8 moves rightward.

FIG. 4C shows the state in which the display portion 1 has been opened to a predetermined angle and the key tops, described later, have been raised. For example, if it is assumed that this predetermined angle is 60°, the cam 13 at the left is positioned at a rotation angle of 240°. Here, the cam 8 is in contact with the cam 13 at the protruding portions 8a and 13a. On the other hand, the cam 14 located on the opposite side of the cam 8 is positioned at a rotation angle of about 0°. Here, the cams 8 and 14 are in contact with each other at the protruding portion 8d and the recessed portion 14b, at the slanting surface 8f and the slanting surface 14c, and at the recessed portion 8e and the protruding portion 14a. The cam 8 is meshed with the cam 14, and is thus located at the right-hand end of the stroke of the reciprocating movement of the cam 8. Naturally, the projection 8g formed integrally on the cam 8 is located at the right.

FIG. 4D shows the state in which the display portion 1 is further opened. In this state, the cam 13 at the left is positioned, for example, at a rotation angle of about 300°. Here, the cam 8 is in contact with the cam 13 at the protruding portions 8a and 13a. On the other hand, the cam 14 located on the opposite side of the cam 8 is positioned at a rotation angle of about 60°. Here, the cams 8 and 14 are in contact with each other at the protruding portion 8d and the recessed portion 14b and at the recessed portion 8e and the protruding portion 14a. During the transition from the state shown in FIG. 4C to the state shown in FIG. 4D, the cams 8 and 14 remain meshed with each other, and therefore it never occurs that the cam 14 presses the cam 8 further leftward. Thus, the cam 8 remains at the right-hand end of the stroke of its reciprocating movement, and naturally the projection 8g formed integrally thereon remains at the right.

Here, it is important that, of the surfaces at which two cams are meshed, at least one surface be perpendicular to the rotation axis. Specifically, of the surfaces 8a, 8b, 13a, and 13b, at least one surface needs to be perpendicular to the rotation axis; similarly, of the surfaces 8a, 8b, 14a, and 14b, at least one surface needs to be perpendicular to the rotation axis. Otherwise, the cam 8 continues to move as the display portion is further opened. This means that the height of the key tops varies constantly, which greatly spoils the operability of the keyboard.

Moreover, it is also important that the cam 8 be meshed with either the cam 13 or the cam 14 respectively when the display portion is closed to the angle at which the key tops are completely lowered or when it is opened to the predetermined angle at which the key tops are completely raised. Specifically, it is advisable to design so that, when the cam 8 is meshed with the cam 13, the cams 8 and 14 are in a state rotated through the aforementioned predetermined angle relative to each other away from the state in which they are meshed. In this design, when the shaft 12 is rotated through the predetermined angle, then the cam 8 is meshed with the cam 14.

As described above, the projection 8g of the cam 8 moves together with the cam 8, specifically over a stroke of 2 to 3 mm in this embodiment. Moreover, when the cams are meshed together, they are meshed with slight gaps left between them so that they are not fitted together perfectly. Without these gaps, the cams do not move.

The movement of the projection 8g that protrudes forward from the cam 8 is transmitted to the lever 15 through the cut 15a thereof that engages with the projection 8g, and thus causes the lever 15 to rotate clockwise about the pin 17. As a result, the movement of the projection 8g appears in a magnified form at the cut 15b. This movement is then transmitted to the pin "p," and thus causes the middle sheet 22 to move 4 to 5 mm leftward from its initial position. Thereafter, even if the display portion 1 is further opened as shown in FIG. 4D, the protruding portion 13a of the cam 13 only slides on the protruding portion 8a of the cam 8. Moreover, a margin is secured in the range of rotation of the cams 8 and 14 within which they remains meshed. Thus, the cam 8 does not move, and accordingly the middle sheet 22 remains in position.

Conversely, when the display portion 1 starts closing from the state shown in FIG. 4D and the shaft 12 starts rotating in the reverse direction, the cam 14 starts rotating in the reverse direction together. When they rotate past the state shown in FIG. 4C, the slanting surface 14c starts sliding on the slanting surface 8c, and thus the cams 8 and 14 start going out of mesh with each other, causing the cam 8, and thus the projection 8g, to move leftward. Meanwhile, the cam 13 rotates in the reverse direction together, and thus the protruding portion 8a moves off the protruding portion 13a. As a result, the slanting surface 13c starts sliding on the slanting surface 8c, and thus the cams 8 and 13 start coming into mesh with each other.

When the display portion 1 is closed, as shown in FIG. 4B, the protruding portion 8d runs onto the protruding portion 4a, and the cam 8, and thus the projection 8g, moves to the left-side end. In this state, the surfaces of the cams 8 and 13 that face each other are all in contact with each other, and thus the cams 8 and 13 are now meshed with each other. The movement of the projection 8g is transmitted to the lever 15 through the cut 15a thereof that engages with the projection 8g, and thus causes the lever 15 to rotate counterclockwise about the pin 17. As a result, the movement of the projection 8g appears in a magnified form at the cut 15b. This movement is then transmitted to the pin "p," and thus causes the middle sheet 22 to move rightward back to its initial position.

Figure 6:
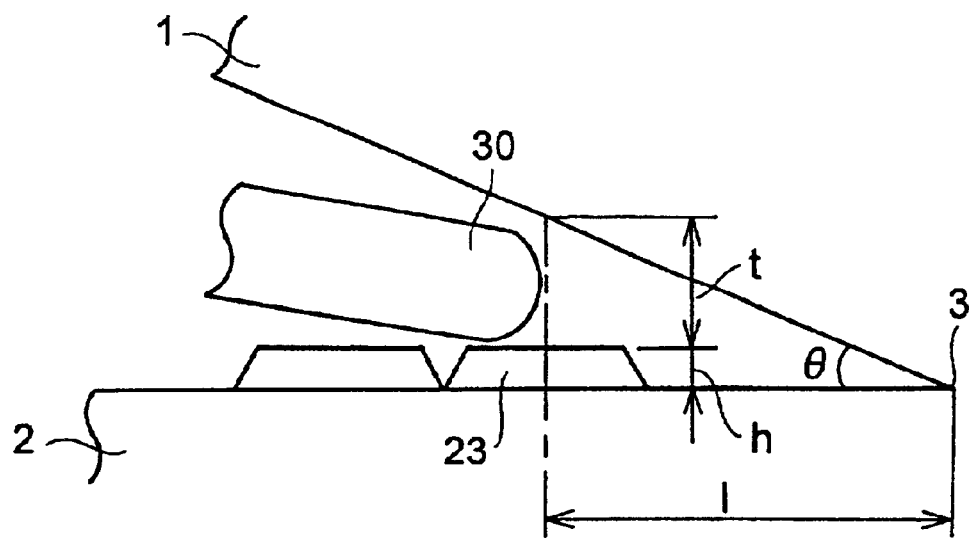
FIG. 6 is an enlarged side view of the hinge portion and the surrounding portion.

In the structure described above, when the display portion 1 is opened to a predetermined angle with respect to the body 2, the key tops 23, described later, are raised to a predetermined height so as to be ready for key input. However, even if the display portion 1 is opened to over the predetermined angle, the key tops 23 are not raised above the predetermined height but are kept at that height so as to be kept ready for key input. FIG. 6 is an enlarged side view schematically showing the hinge portion and the surrounding portion in this state. Here, it is preferable that conditional formula (1) noted below be fulfilled.

$$\theta \geq \tan^{-1}[(h+t)/l] \qquad (1)$$

where

θ represents the predetermined angle of the display portion 1 with respect to the body 2;

h represents the predetermined height from the top surface of the body 2 to the top surface of the key tops 23 in the state ready for key input;

t represents the thickness of a finger 30 inserted between the key tops 23 and the display portion 1; and l represents the distance from the hinge portion 3 to the center of the key top 23 nearest thereto.

This conditional formula (1) defines the conditions under which the display portion 1 is opened so as to permit key operation. When typical values $$h=3 \text{ mm}, t=12 \text{ mm}, l=57 \text{ mm}$$

are substituted in conditional formula (1), it gives θ≧ about 15°. It is to be understood, however, that these specific values are not meant to restrict the implementation of the invention in any way.

Figure 7:
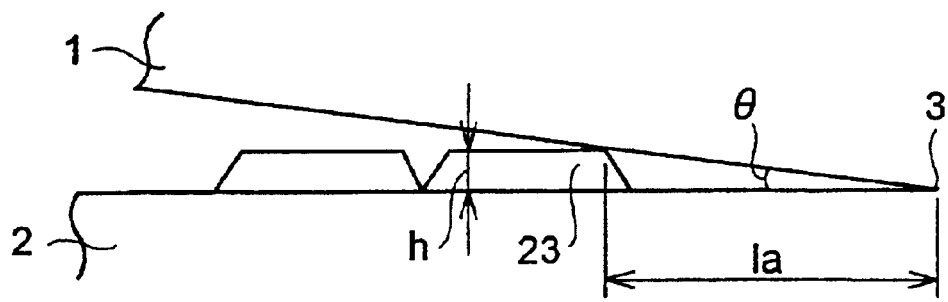
FIG. 7 is an enlarged side view of the hinge portion and the surrounding portion.

Similarly, in the structure described above, when the display portion 1 is closed to a predetermined angle with respect to the body 2, the key tops 23 start being lowered. FIG. 7 is an enlarged side view schematically showing the hinge portion and the surrounding portion in this state. Here, it is preferable that conditional formula (2) noted below be fulfilled.

$$\theta \geq \tan^{-1}(h+la)$$

where

θ represents the predetermined angle of the display portion 1 with respect to the body 2;

h represents the height from the top surface of the body 2 to the top surface of the key tops 23 in the state ready for key input; and la represents the distance from the hinge portion 3 to the nearest edge of the top surface of the key top 23 nearest thereto.

This conditional formula (2) defines the conditions under which, when the display portion 1 is closed, it does not touch the key tops 23. When typical values $$h=3 \text{ mm}, la=50 \text{ mm}$$

are substituted in conditional formula (2), it gives θ≧ about 3°. It is to be understood, however, that these specific values are not meant to restrict the implementation of the invention in any way.

An alerting means may be additionally provided for making the user notice that the display portion 1 has been opened with respect to the body 2 so as to permit key input. This is realized, for example as shown in FIG. 3, by providing a switch 31 near the front end of the lever 15. When the display portion 1 opens and the lever 15 rotates, this switch 31 is turned on so that the alerting means, unillustrated, alerts the user to the state ready for key input.

The switch 31 is realized with, for example, a limit switch of a mechanical type. The alerting means is realized with an LED, buzzer, or the like. Alternatively, alerting may be achieved by painting a portion of the middle sheet 2 red and forming a window in the body 2 through which to observe the red portion as the middle sheet 2 is slid. It should be noted, however, that this alerting needs to be performed before the power to the body is turned on, and therefore, in cases where an electrical means such as an LED or buzzer is used, an auxiliary power source needs to be provided.

Of the cam surfaces formed on the cams described above, the slanting surfaces are each so formed as to make an angle of about 60° with respect to the length direction of the shaft 12. The cams are all made of stainless steel (SUS). The cams need to be given sufficient mechanical strength so that they do not break or crack in the middle of operation. Moreover, to prevent the concentration of stress on a single point, the cams need to be given smooth surfaces. In this embodiment, the cams are made of, as a material that meets these requirements, stainless steel (SUS) molded by multiple injection molding (MIM).

The horizontal movement stroke of the projection 8g of the cam 8 can be increased by increasing the radius of the cams, or by reducing the angle of the slanting surfaces of the cams, i.e. by making those angles acute. However, since the present invention aims at reducing the thickness of electronic devices, there is a practical limit to increasing the radius of the cams. On the other hand, making the angles of the slanting surfaces of the cams acute makes the interlocked cam as a whole longer, which is contrary to miniaturization.

In the structure described above, instead of one of the cams 13 and 14, a spring member may be used in such a way as to press the cam 8 against the other cam. That is, it is also possible to use a spring member that presses the cam 8 in the direction associated with either the opening or closing movement of the display portion 1. This makes the structure of the interlocked cam simpler.

Although not illustrated, keyboard slide mechanisms S may be provided at both the left-hand and right-hand ends of the rear side of the body 2 so as to operate in synchronism. This helps reduce the stress that acts on the individual keyboard slide mechanisms as the display portion 1 is opened or closed.

Alternatively, of the keyboard slide mechanisms S provided at both the left-hand and right-hand ends of the rear side of the body 2, one may be made to operate in association with the opening movement of the display portion 1 and the other in association with the closing movement of the display portion 1 so that they each slide the middle sheet 22 in one or the opposite direction. Here, in each of the keyboard slide mechanisms, for example, instead of one of the cams 13 and 14, a spring member may be used in such a way as to press the cam 8 against the other cam. That is, it is also possible to use a spring member that presses the cam 8 in the direction associated with either the opening or closing movement of the display portion 1.

Figure 5A:
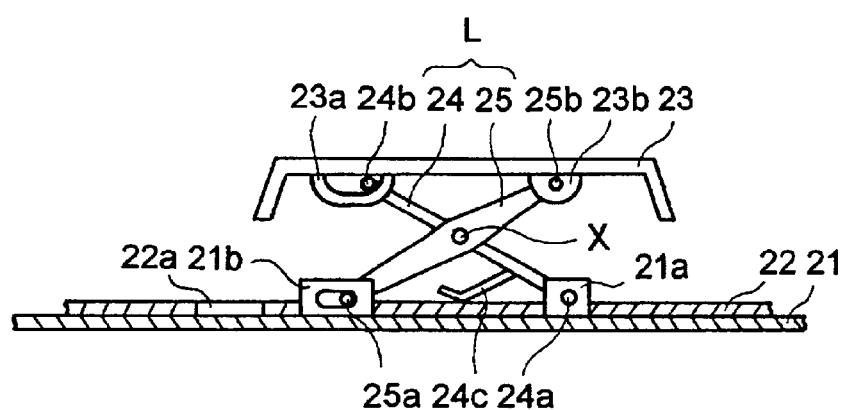
FIGS. 5A and 5B are diagrams schematically showing the key structure of the keyboard used in the embodiment.
Figure 5B:
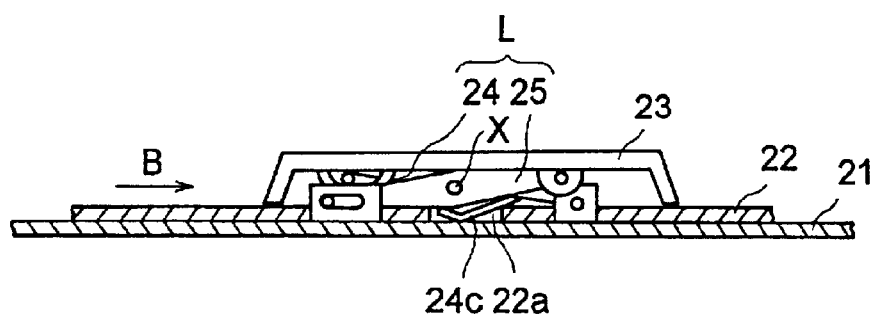

FIGS. 5A and 5B are front views schematically showing the key structure of the keyboard used in this embodiment. FIG. 5A shows a key in the raised state as a result of the display portion being opened, and FIG. 5B shows a key in the lowered state as a result of the display portion being closed. As shown in these figures, on the body 2, a key base 21 is fixed that forms the base of the keyboard 4, and, on top of the key base 21, the middle sheet 22 is laid. Further on top, key tops 23, for example formed by rein molding, are arranged as keys, with each key top supported from below by a linking member L composed of a first arm 24 and a second arm 25 combined together.

The first arm 24 and the second arm 25 are coupled together in a shape like the letter X to form the linking member L, with the two arms rotatable relative to each other about a center shaft X. At the bottom end of the first arm 24 is provided a shaft 24a, which is fitted into brackets 21a provided so as to protrude upward from the top surface of the key base 21. Thus, the first arm 24 is pivotably supported on the key base 21. Moreover, at the top end of the first arm 24 is provided a shaft 24b, which is fitted into slide brackets 23a having elongate holes that are provided so as to protrude downward from the bottom surface of the key top 23. Thus, the first arm 24 is supported on the key top 23 so as to be pivotable and in addition slidable within a predetermined range relative thereto.

On the other hand, at the bottom end of the second arm 25 is provided a shaft 25a, which is fitted into slide brackets 21b provided so as to protrude upward from the top surface of the key base 21. Thus, the second arm 25 is pivotably supported on the key base 21. Moreover, at the top end of the second arm 25 is provided a shaft 25b, which is fitted into brackets 23b provided so as to protrude downward from the bottom surface of the key top 23. Thus, the second arm 25 is supported on the key top 23 so as to be pivotable relative thereto.

Moreover, from a lower portion of the first arm 24, a pressing portion 24c shaped like a flat spring extends obliquely downward toward the center as seen from the front. In the state shown in FIG. 5A, in the portion of the middle sheet 22 immediately below the pressing portions 24c is provided a so-called membrane switch (not shown). When the key top 23 is pressed down, the tip of the pressing portion 24c presses the middle sheet 22 and turns the membrane switch on.

Suppose that the display portion 1 that has up to the moment been open is now closed. By the action of the keyboard slide mechanism S described above, the middle sheet 22 slides rightward as indicated by arrow B from the state shown in FIG. 5A to that shown in FIG. 5B. This brings a hole 22a formed in the middle sheet 22 to just under the pressing portion 24c, and thus the pressing portion 24c falls into the hole 22a. This causes the linking member L to collapse, and as a result the key top 23 is lowered.

Now suppose that, conversely, the display portion 1 that has up to the moment been closed is now opened. By the action of the keyboard slide mechanism S, the middle sheet 22 slides leftward in the direction opposite to that indicated by arrow B. This brings the hole 22a formed in the middle sheet 22 away from the pressing portion 24c, and thus the pressing portion 24c runs onto the middle sheet 22. This causes the linking member L to unfold, and as a result the key top 23 is raised. It is to be noted that, in the figures, the movement stroke of the hole 22a is shown longer than it actually is for easier understanding of the mechanism.

In the structure described above, a sensor for detecting whether the display portion 1 is open or closed may be additionally provided so that, on the basis of the signal from the sensor, a CPU provided in the body 2 controls at least one of the cam 8, the lever 15, and the middle sheet 22 with a driving device such as a motor or solenoid so that the key tops 23 of the keyboard are raised and lowered as the display portion 1 is opened and closed.

On the other hand, the keyboard slide mechanism S shown in FIG. 3 is a purely mechanical mechanism that is not subject to control by a CPU. Therefore, even in an uncontrollable state as when the CPU is in a hang-up condition, it is possible to lower the key tops without fail by closing the display portion 1, and thus it is possible to prevent damage to the display portion or failure of the keyboard that may result from collision between the key tops and the display portion 1.

The keyboard slide mechanism embodying the invention described above is particularly suitable for use in notebook personal computers, personal digital assistants, word processors, type writers, and the like. Needless to say, however, it finds wide application, not only in such devices as named just above, but in electronic devices in general including information devices such as cellular telephones, that are provided with a display device and an input device such as a keyboard.

What is claimed is:

1. A keyboard slide mechanism for use in a keyboard that is so structured that key tops are raised and lowered as a sliding member is slid, comprising:

a rotary member that can be rotated;

converting means for converting rotating movement of the rotary member into translating movement, the converting means including at least two cams arranged on the rotary member in contact with each other; and movement magnifying means for magnifying the translating movement produced by the converting means, wherein the key tops are raised and lowered by converting the rotating movement of the rotary member into translating movement with the converting means, then magnifying the translating movement with the movement magnifying means, and then transmitting the magnified translating movement to the sliding member.

2. A keyboard slide mechanism as claimed in claim 1, wherein keys of the keyboard are individually provided with linking members and, as the sliding member is slid, the linking members rotate in such a way as to raise and lower the key tops placed on the linking member.

3. A keyboard slide mechanism as claimed in claim 1, wherein the sliding member slides parallel to a rotation shaft of the rotary member.

4. A keyboard slide mechanism for use in a keyboard that is so structured that key tops are raised and lowered as a sliding member is slid, comprising:

a rotary member that can be rotated;

a cam member for converting rotating movement of the rotary member into translating movement, the cam member including at least two cams arranged on the rotary member in contact with each other; and a lever member for magnifying the translating movement produced by the cam member, wherein the key tops are raised and lowered by converting the rotating movement of the rotary member into translating movement with the cam member, then magnifying the translating movement with the lever member, and then transmitting the magnified translating movement to the sliding member.

5. A keyboard slide mechanism as claimed in claim 4, wherein keys of the keyboard are individually provided with linking members and, as the sliding member is slid, the linking members rotate in such a way as to raise and lower the key tops placed on the linking member.

6. A keyboard slide mechanism as claimed in claim 4, wherein the sliding member slides parallel to a rotation shaft of the rotary member.

7. A keyboard slide mechanism as claimed in claim 4, wherein the lever member is as thick as or less thick than the cam member.

8. A keyboard slide mechanism as claimed in claim 4, wherein the cam member comprises a first cam that rotates together with the rotating movement of the rotary member and a second cam that translates as rotating movement of the first cam is transmitted thereto through cam surfaces of the first and second cams, and movement of the second cam is transmitted to the lever member.

9. A keyboard slide mechanism as claimed in claim 8, wherein the first and second cams are arranged in contact with each other on a rotation shaft of the rotary member,
the first cam rotating together with the rotation shaft and the second cam sliding axially along the rotation shaft.

10. A keyboard slide mechanism as claimed in claim 8, wherein, on a plane on which the first and second cams make contact with each other, at least one surface of at least one of the first and second cams is perpendicular to the rotation shaft.

11. A keyboard slide mechanism as claimed in claim 8, wherein the cam member comprises two first cams that rotate together with the rotating movement of the rotary member and a second cam that translates as rotating movement of the first cams is transmitted thereto through cam surfaces of the first and second cams,
the second cam being arranged between and in contact with the first cams and having cam surfaces formed on both sides thereof facing the first cams,
one of the first cams engaging with the second cam when the key tops of the keyboard are lowered,
the other of the first cams engaging with the second cam when the key tops of the keyboard are raised.

12. An information device comprising a keyboard that is so structured that key tops are raised and lowered as a sliding member is slid, a lid portion that can be opened and closed with respect to a body portion in which the keyboard is housed, and a keyboard slide mechanism that makes the sliding member slide as the lid portion is opened and closed,
wherein the keyboard slide mechanism comprises:
a rotary member that rotates as the lid portion is opened and closed;
converting means for converting rotating movement of the rotary member into translating movement, the converting means including at least two cams arranged on the rotary member in contact with each other; and
movement magnifying means for magnifying the translating movement produced by the converting means,
wherein, as the lid portion is opened and closed, the rotary member rotates, and the key tops are raised and lowered by converting the rotating movement of the rotary member into translating movement with the converting means, then magnifying the translating movement with the movement magnifying means, and then transmitting the magnified translating movement to the sliding member.

13. An information device comprising a keyboard slide mechanism as claimed in claim 12,
wherein keys of the keyboard are individually provided with linking members and, as the sliding member is slid, the linking members rotate in such a way as to raise and lower the key tops placed on the linking member.

14. An information device comprising a keyboard slide mechanism as claimed in claim 12,
wherein the lid portion can be opened and closed with respect to the body portion by being rotated about a rotary joint and, when the lid portion is opened to a predetermined angle with respect to the body portion, the key tops are raised to a predetermined height so as to be brought into a state ready for key input but, even when the lid portion is opened to over the predetermined angle, the key tops are kept in the state ready for key input without being raised further.

15. An information device comprising a keyboard slide mechanism as claimed in claim 14,
wherein the following conditional formula is fulfilled:

$$\theta \geq \tan^{-1}[(h+t)/l]$$

where
$\theta$ represents the predetermined angle of the lid portion with respect to the body portion;
h represents the predetermined height from a top surface of the body portion to a top surface of the key tops in the state ready for key input;
t represents a thickness of a finger inserted between the key tops and the lid portion; and
l represents a distance from the rotary joint to a center of a key top nearest thereto.

16. An information device comprising a keyboard slide mechanism as claimed in claim 14,
wherein the keyboard slide mechanism consists of two portions arranged near both ends of the rotary joint, and the two portions of the keyboard slide mechanism operate in synchronism.

17. An information device comprising a keyboard slide mechanism as claimed in claim 14,
wherein the keyboard slide mechanism consists of two portions arranged near both ends of the rotary joint, one portion of the keyboard slide mechanism making the sliding member slide when the lid portion is opened with respect to the body portion, the other portion of the keyboard slide mechanism making the sliding member slide when the lid portion is closed with respect to the body portion.

18. An information device comprising a keyboard slide mechanism as claimed in claim 12,
wherein the lid portion can be opened and closed with respect to the body portion by being rotated about a rotary joint and, when the lid portion is closed to a predetermined angle with respect to the body portion, the key tops start being lowered.

19. An information device comprising a keyboard slide mechanism as claimed in claim 18, wherein the following conditional formula is fulfilled:

$$\theta \geq \tan^{-1}(h+la)$$

where
- θ represents the predetermined angle of the lid portion with respect to the body portion;
- h represents a height from a top surface of the body portion to a top surface of the key tops in a state ready for key input; and
- la represents a distance from the rotary joint to a nearest edge of a top surface of a key top nearest thereto.

20. An information device comprising a keyboard slide mechanism as claimed in claim 12, further comprising:
    alerting means for making a user notice that the lid portion has been opened with respect to the body portion and the keyboard has been brought into a state ready for key input.

21. An information device comprising a keyboard slide mechanism as claimed in claim 12,
    wherein the lid portion is provided with a display portion.

22. An information device comprising a keyboard that is so structured that key tops are raised and lowered as a sliding member is slid, a lid portion that can be opened and closed with respect to a body portion in which the keyboard is housed, and a keyboard slide mechanism that makes the sliding member slide as the lid portion is opened and closed,
    wherein the keyboard slide mechanism comprises:
        a rotary member that rotates as the lid portion is opened and closed;
        a cam member for converting rotating movement of the rotary member into translating movement, the cam member including at least two cams arranged on the rotary member in contact with each other; and
        a lever member for magnifying the translating movement produced by the cam member,
    wherein, as the lid portion is opened and closed, the rotary member rotates, and the key tops are raised and lowered by converting the rotating movement of the rotary member into translating movement with the cam member, then magnifying the translating movement with the lever member, and then transmitting the magnified translating movement to the sliding member.

23. An information device comprising a keyboard slide mechanism as claimed in claim 22,
    wherein keys of the keyboard are individually provided with linking members and, as the sliding member is slid, the linking members rotate in such a way as to raise and lower the key tops placed on the linking member.

24. An information device comprising a keyboard slide mechanism as claimed in claim 22,
    wherein the lid portion can be opened and closed with respect to the body portion by being rotated about a rotary joint and, when the lid portion is opened to a predetermined angle with respect to the body portion, the key tops are raised to a predetermined height so as to be brought into a state ready for key input but, even when the lid portion is opened to over the predetermined angle, the key tops are kept in the state ready for key input without being raised further.

25. An information device comprising a keyboard slide mechanism as claimed in claim 24,
    wherein the keyboard slide mechanism consists of two portions arranged near both ends of the rotary joint, and the two portions of the keyboard slide mechanism operate in synchronism.

26. An information device comprising a keyboard slide mechanism as claimed in claim 24,
    wherein the following conditional formula is fulfilled:

$$\theta \geq \tan^{-1}[(h+t)/l]$$

where
- θ represents the predetermined angle of the lid portion with respect to the body portion;
- h represents the predetermined height from a top surface of the body portion to a top surface of the key tops in the state ready for key input;
- t represents a thickness of a finger inserted between the key tops and the lid portion; and
- l represents a distance from the rotary joint to a center of a key top nearest thereto.

27. An information device comprising a keyboard slide mechanism as claimed in claim 24,
    wherein the keyboard slide mechanism consists of two portions arranged near bath ends of the rotary joint, one portion of the keyboard slide mechanism making the sliding member slide when the lid portion is opened with respect to the body portion, the other portion of the keyboard slide mechanism making the sliding member slide when the lid portion is closed with respect to the body portion.

28. An information device comprising a keyboard slide mechanism as claimed in claim 22,
    wherein the lid portion is provided with a display portion.

29. An information device comprising a keyboard slide mechanism as claimed in claim 22, further comprising:
    alerting means for making a user notice that the lid portion has been opened with respect to the body portion and the keyboard has been brought into a state ready for key input.

30. An information device comprising a keyboard slide mechanism as claimed in claim 22,
    wherein the hid portion can be opened and closed with respect to the body portion by being rotated about a rotary joint and, when the lid portion is closed to a predetermined angle with respect to the body portion, the key tops start being lowered.

31. An information device comprising a keyboard slide mechanism as claimed in claim 30,
    wherein the following conditional formula is fulfilled:

$$\theta \geq \tan^{-1}(h+la)$$

where
- θ represents the predetermined angle of the lid portion with respect to the body portion;
- h represents a height from a top surface of the body portion to a top surface of the key tops in a state ready for key input; and
- la represents a distance from the rotary joint to a nearest edge of a top surface of a key top nearest thereto.

* * * * *